US008553272B2

(12) United States Patent
Iguchi (10) Patent No.: US 8,553,272 B2
(45) Date of Patent: Oct. 8, 2013

(54) IMAGE PROCESSING APPARATUS, IMAGE PROCESSING METHOD, PROGRAM THEREFOR, AND MEDIUM STORING PROGRAM

(75) Inventor: Shunsuke Iguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 12/562,338

(22) Filed: Sep. 18, 2009

(65) Prior Publication Data
US 2010/0079798 A1 Apr. 1, 2010

(30) Foreign Application Priority Data

Oct. 1, 2008 (JP) ................................. 2008-256644
Sep. 7, 2009 (JP) ................................. 2009-206459

(51) Int. Cl.
*G06K 15/00* (2006.01)
(52) U.S. Cl.
USPC ......... 358/1.18; 358/1.15; 358/1.5; 358/1.16; 358/1.17; 715/221; 715/222; 715/224; 715/225
(58) Field of Classification Search
None
See application file for complete search history.

(56) References Cited

U.S. PATENT DOCUMENTS

| 6,441,919 | B1* | 8/2002 | Parker et al. ................. 358/1.18 |
| 6,535,293 | B1* | 3/2003 | Mitsuhashi .................. 358/1.13 |
| 7,327,487 | B2* | 2/2008 | Prosi ............................ 358/1.16 |
| 2003/0076535 | A1* | 4/2003 | Prosi ............................ 358/1.16 |
| 2004/0062451 | A1* | 4/2004 | Kita et al. ..................... 382/276 |
| 2004/0141197 | A1 | 7/2004 | Gauthier |
| 2006/0031773 | A1* | 2/2006 | Uchida ......................... 715/760 |
| 2006/0044614 | A1 | 3/2006 | Cohen et al. |
| 2007/0288843 | A1* | 12/2007 | Makino ......................... 715/520 |
| 2008/0155469 | A1* | 6/2008 | Uchida ......................... 715/810 |
| 2009/0087208 | A1* | 4/2009 | Ogasawara .................... 399/82 |
| 2009/0257084 | A1* | 10/2009 | Sakamoto .................... 358/1.15 |

FOREIGN PATENT DOCUMENTS

| EP | 0809213 A2 | 11/1997 |
| JP | 2005-538438 A | 12/2005 |
| KR | 10-2005-0108935 A | 11/2005 |

OTHER PUBLICATIONS

European Search Report in Eurpopean Application No. 0 809 213 A2, dated Jan. 27, 2010.
The PPML Working Group, PPML Functional Specification, Version 2.1; http://www.podi.org/, (Jul. 31, 2002).

* cited by examiner

*Primary Examiner* — Hilina K Demeter
(74) *Attorney, Agent, or Firm* — Fitzpatrick, Cella, Harper & Scinto (57) ABSTRACT

An image processing apparatus which performs variable printing in accordance with print data containing a fixed object and a variable object determines whether the fixed object overlaps another fixed object. When the image processing apparatus determines that the fixed object overlaps the other fixed object, the image processing apparatus generates data by performing the first image forming processing to combine the fixed object and the other fixed object or the second image forming processing to process the fixed object or the other fixed object. The image processing apparatus stores the generated data. The image processing apparatus extracts the stored data, combines it with the variable object to generate print data, and outputs the print data.

6 Claims, 14 Drawing Sheets

IMAGE PROCESSING APPARATUS, IMAGE PROCESSING METHOD, PROGRAM THEREFOR, AND MEDIUM STORING PROGRAM

BACKGROUND OF THE INVENTION

1. Field of the Invention

The present invention relates to an image processing apparatus, an image processing method for performing variable printing, a program therefore, and a medium storing the program.

2. Description of the Related Art

These days, variable printing is available to superpose a plurality of variable data on fixed data and execute printing quickly.

Various kinds of page description languages have also been developed to efficiently print using variable data. For example, PODi (Print On Demand initiative) defines PPML (Personalized Print Markup Language) (PPML functional Specification, Version 2.1 (http://www.podi.org/)). In variable printing using such a page description language, an object rendered in a fixed region is cached in a storage device.

The cached object is extracted and superposed in a variable region by rendering. It can be controlled to achieve high-speed processing while avoiding repetitive rendering in a fixed region.

In general, fixed data of each object is cached in the storage device for reuse. As for print data in which a plurality of objects overlap each other, the storage device conventionally caches even an image hidden below another object.

The storage device needs to ensure an unnecessary area for an image always hidden below another object. Even such a wasteful image requires data rasterization processing or clipping processing of a subordinate object by a superior object for each record and each page, prolonging the processing time.

SUMMARY OF THE INVENTION

The present invention provides an image processing apparatus capable of increasing the processing speed in variable printing, an image processing method, a program therefore, and a medium storing the program.

The present invention in its first aspect provides an image processing apparatus which performs variable printing in accordance with print data containing a fixed object and a variable object, the apparatus comprising: a first determination unit configured to determine whether the fixed object overlaps another fixed object; a generation unit configured, when the first determination unit determines that the fixed object overlaps the other fixed object, to generate data by performing either first image forming processing to combine the fixed object and the other fixed object or second image forming processing to process the fixed object or the other fixed object; a storage unit configured to store the data generated by the generation unit; and an output unit configured to extract the data stored in the storage unit, combine the data with the variable object to generate print data, and output the print data.

The present invention in its second aspect provides an image processing method executed in an image processing apparatus which performs variable printing in accordance with print data containing a fixed object and a variable object, the method comprising: a first determination step of determining whether the fixed object overlaps another fixed object; a generation step of, when the fixed object is determined in the first determination step to overlap the other fixed object, generating data by performing either first image forming processing to combine the fixed object and the other fixed object or second image forming processing to process the fixed object or the other fixed object; a storage step of storing the data generated in the generation step; and an output step of extracting the data stored in the storage step, combining the data with the variable object to generate print data, and outputting the print data.

The present invention in its third aspect provides a program for generating data to perform variable printing in accordance with print data containing a fixed object and a variable object, the program causing a computer to determine whether the fixed object overlaps other fixed object, when the fixed object is determined to overlap the other fixed object, generate data by performing either first image forming processing to combine the fixed object and the other fixed object or second image forming processing to process the fixed object or the other fixed object, store the generated data, and extract the stored data and combine the data with the variable object, thereby generating print data.

The present invention in its fourth aspect provides a computer-readable medium storing a program for generating data to perform variable printing in accordance with print data containing a fixed object and a variable object, the program causing a computer to determine whether the fixed object overlaps other fixed object, when the fixed object is determined to overlap the other fixed object, generate data by performing either first image forming processing to combine the fixed object and the other fixed object or second image forming processing to process the fixed object or the other fixed object, store the generated data, and extract the stored data and combine the data with the variable object, thereby generating print data.

The computer-readable medium may also be a transmission medium. The transmission medium may be a signal.

The present invention can increase the processing speed in variable printing.

Further features of the present invention will become apparent from the following description of exemplary embodiments with reference to the attached drawings.

DESCRIPTION OF THE EMBODIMENTS

Preferred embodiments of the present invention will be described in detail below with reference to the accompanying drawings. Note that the same reference numerals denote the same parts, and a repetitive description thereof will be omitted.

First Embodiment

<Apparatus Arrangement>

Figure 1:
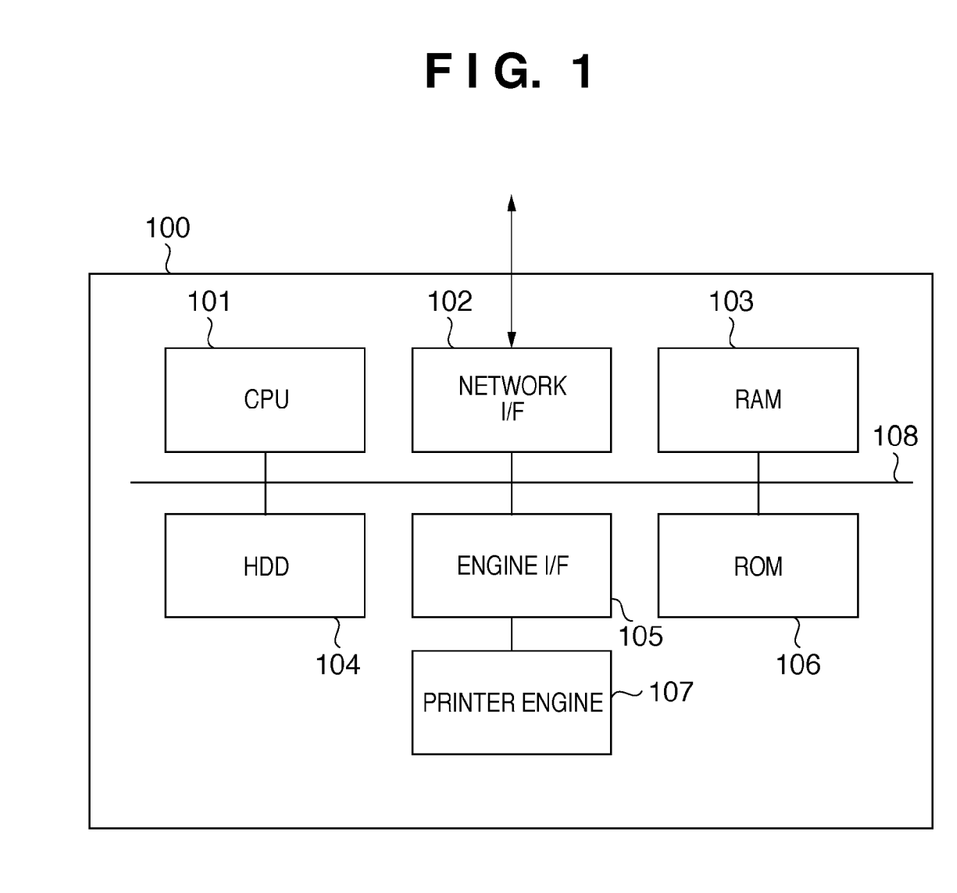
FIG. 1 is a block diagram showing the arrangement of an image processing apparatus in the first embodiment of the present invention.

FIG. 1 is a block diagram showing an image processing apparatus which executes variable printing in the first embodiment of the present invention.

A central processing unit (CPU) 101 in an image processing apparatus 100 executes control of each unit of the apparatus, calculation, and a program stored in a storage device via a system bus 108. A random access memory (RAM) 103 is used as a temporary storage area and work memory when a printing apparatus operates. A hard disk drive (HDD) 104 is a large-capacity storage device, and stores a variety of control programs to be executed by the CPU 101. The HDD 104 is also used as a temporary storage area for data to be processed. A ROM 106 is a storage device which stores the boot processing program of the image processing apparatus.

A network interface (I/F) 102 communicates with another apparatus such as a host computer via an external network. An engine interface (I/F) 105 communicates with and controls a printer engine 107. The printer engine 107 forms an image on a physical paper surface according to, for example, electrophotography or an inkjet image forming technique.

Figure 2:
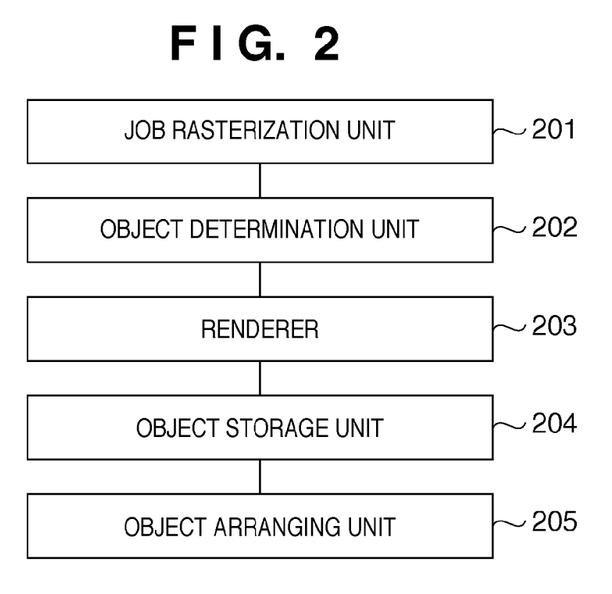
FIG. 2 is a block diagram showing the software module arrangement of the image processing apparatus in the embodiment.

FIG. 2 is a block diagram showing software modules which execute variable printing in the embodiment of the present invention. Each software module is expanded in the RAM 103, invoked by a program, and executed by the CPU 101.

A job rasterization unit 201 rasterizes a variable print job received via the network I/F 102. An object determination unit 202 determines the attribute of an object contained in the rasterized variable print job. A renderer 203 renders an input object to generate a bitmap image. An object storage unit 204 stores the generated bitmap object in the HDD 104 based on determination by the object determination unit 202.

An object arranging unit 205 arranges, on a page, an object generated by the renderer or an object stored in the HDD 104 by the object storage unit 204.

Figure 3:
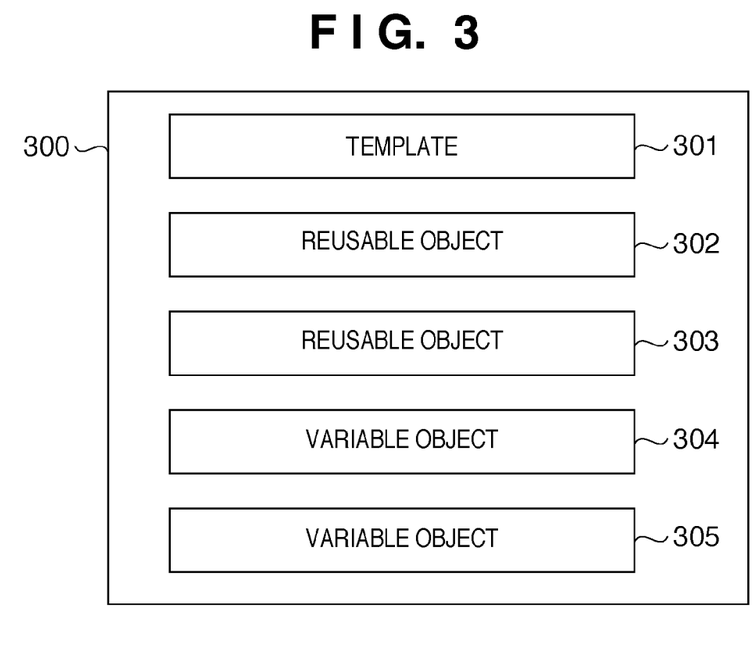
FIG. 3 is a view showing the structure of a variable print job in the PPML language.

FIG. 3 is a view showing the structure of a variable print job in the PPML language. A variable print job 300 always contains one template file 301. In addition to the template, the variable print job 300 contains reusable objects 302 and 303, and variable objects 304 and 305.

A variable print job described in the PPML language will be exemplified. However, the description language is not particularly limited to the PPML language as long as the object structure enables variable printing.

<Sequence of Example of Variable Print Processing>

Figure 12:
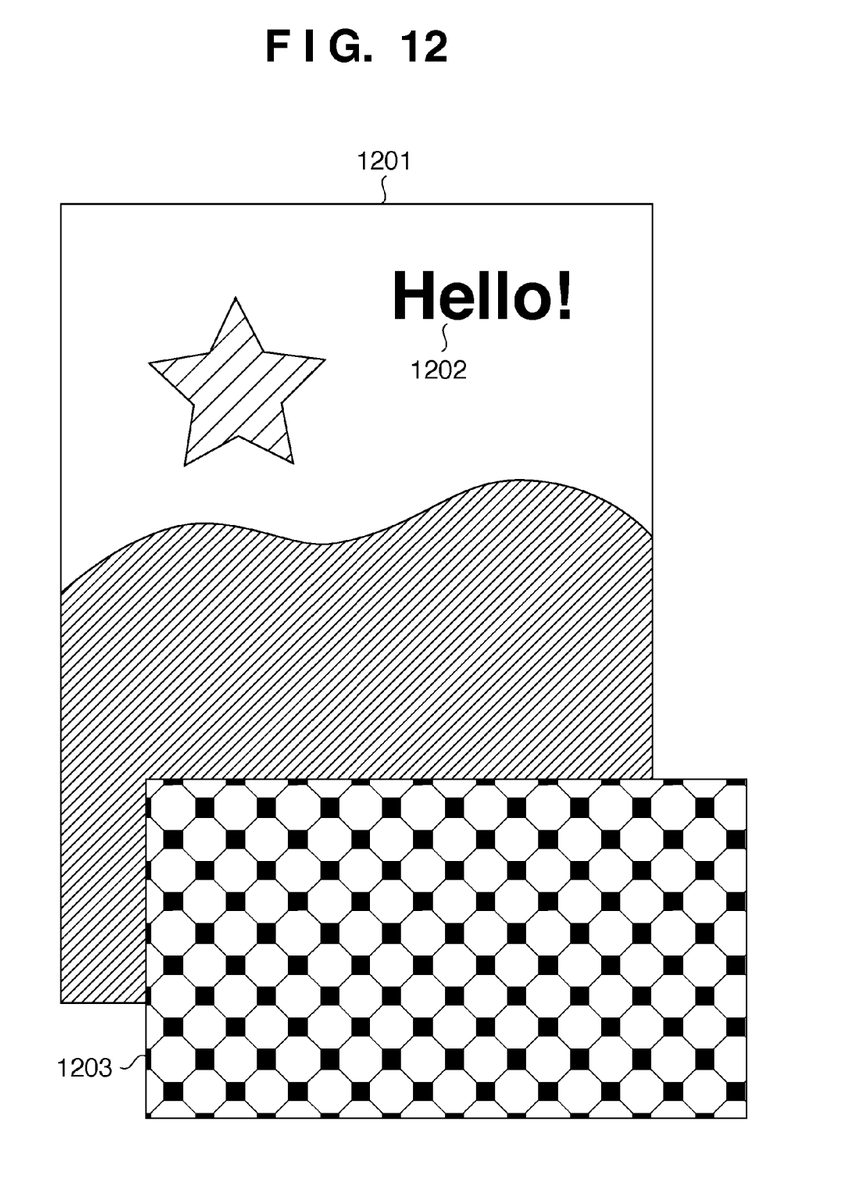
FIG. 12 is a view showing an example of variable printing.
Figure 13:
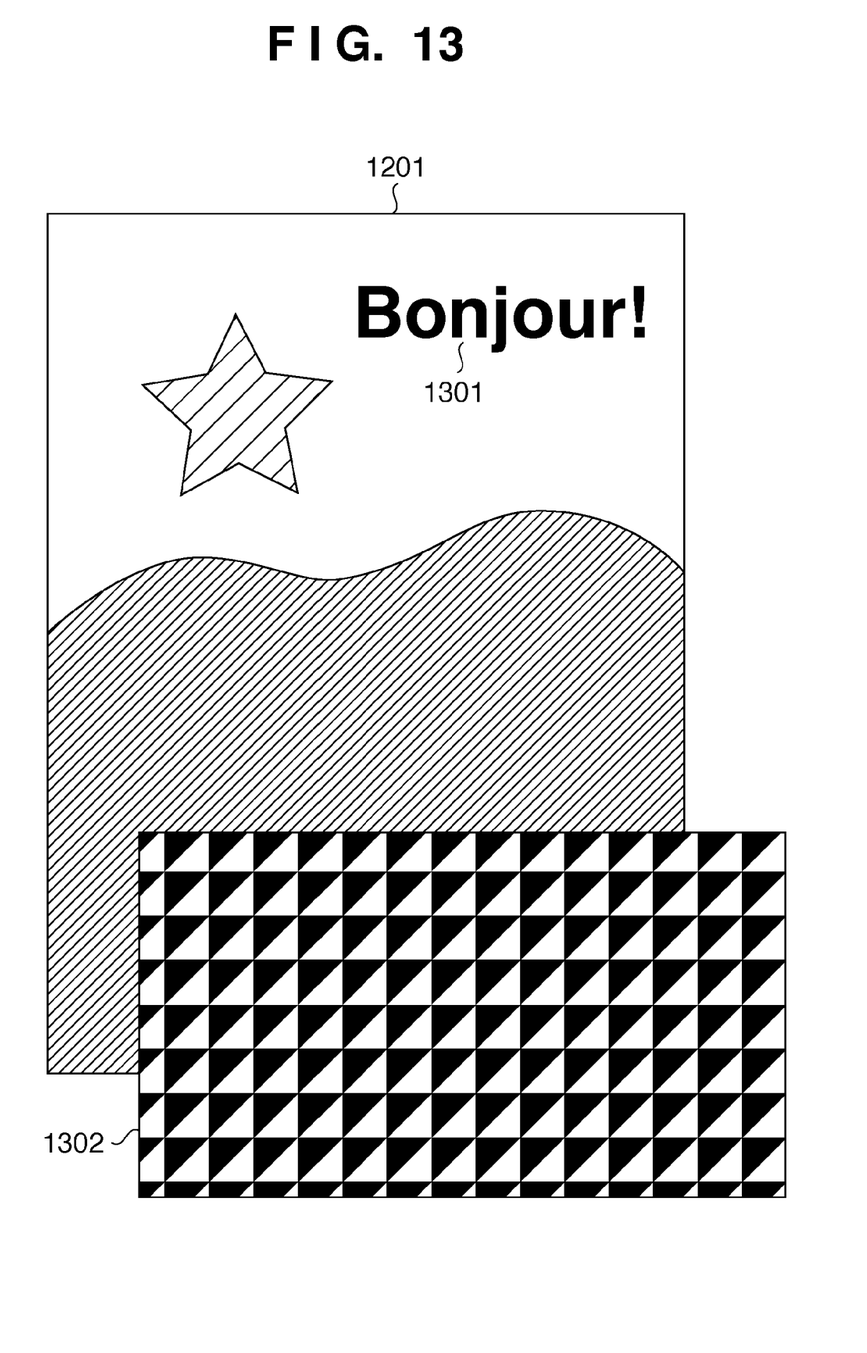
FIG. 13 is a view showing another example of variable printing.

FIGS. 12 and 13 are views showing examples of variable printing on the premise of the embodiment. In FIG. 12, a reusable object 1201 and 1203 are fixed objects, and variable objects 1202 is arranged on it. Here, a fixed object is an reusable object which is reused for plural pages and/or plural jobs and/or plural variable records. On the other hand, a variable object is an object whose content varies by each pages or each of variable records. In short, for example, variable objects 1202 and 1301 are the same object (content of the object is variable such as 1202 and 1301). Fixed objects 1203 and 1302 are different independent objects.

Figure 14:
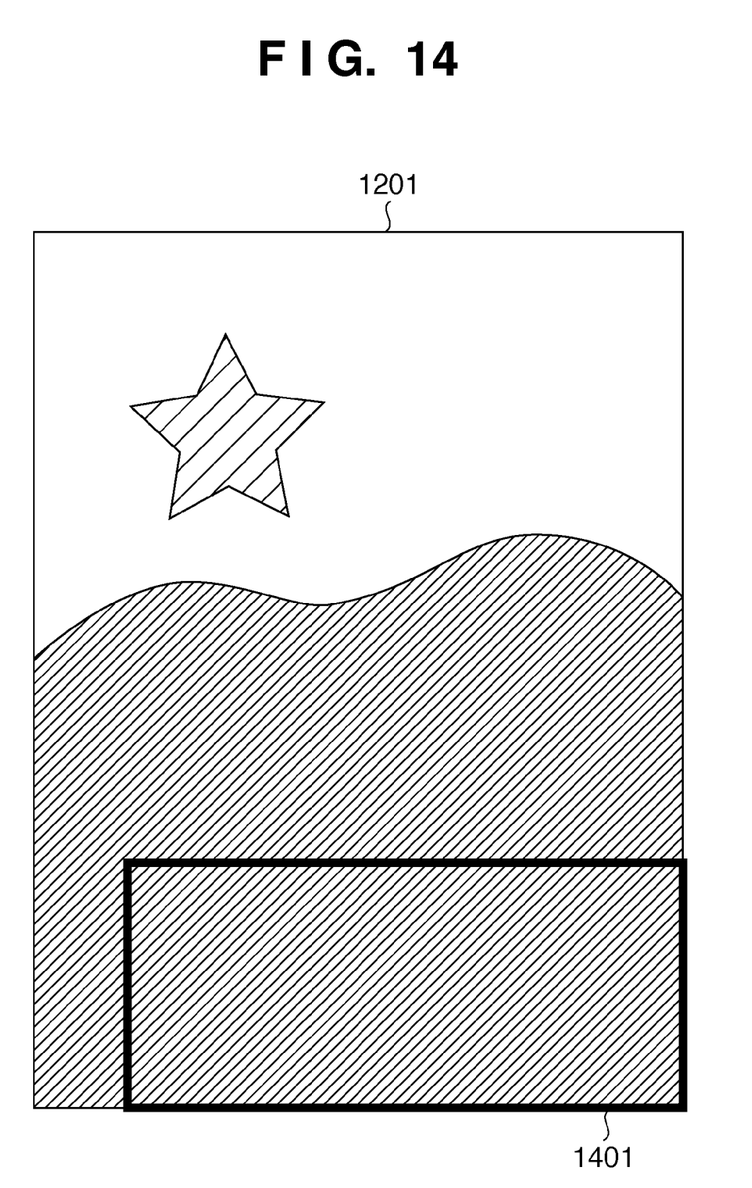
FIG. 14 is a view showing a background image in variable printing shown in FIGS. 12 and 13.

FIG. 14 is a view showing only the fixed object, that is, reusable object 1201 in variable printing of FIGS. 12 and 13. The background image is reused together with other objects, as shown in FIG. 12 or 13, and is called a reusable object. A rectangular region 1401 of the reusable object 1201 is always shielded by the fixed objects 1203 and 1302.

In practice, an image in the rectangular region 1401 is hidden and is not printed finally. However, the image including its information is cached in the HDD 104 or RAM 103, and undergoes image processing by the CPU 101.

Especially in commercial variable printing, many high-resolution fixed objects are often cached. In this case, the storage device caches a non-negligible amount of unnecessary information.

In addition to the problem of the amount of information cached in the HDD 104 or RAM 103, the CPU 101 takes a long time to rasterize a stored image in the RAM 103 and perform compression/decompression and image processing.

Figure 15:
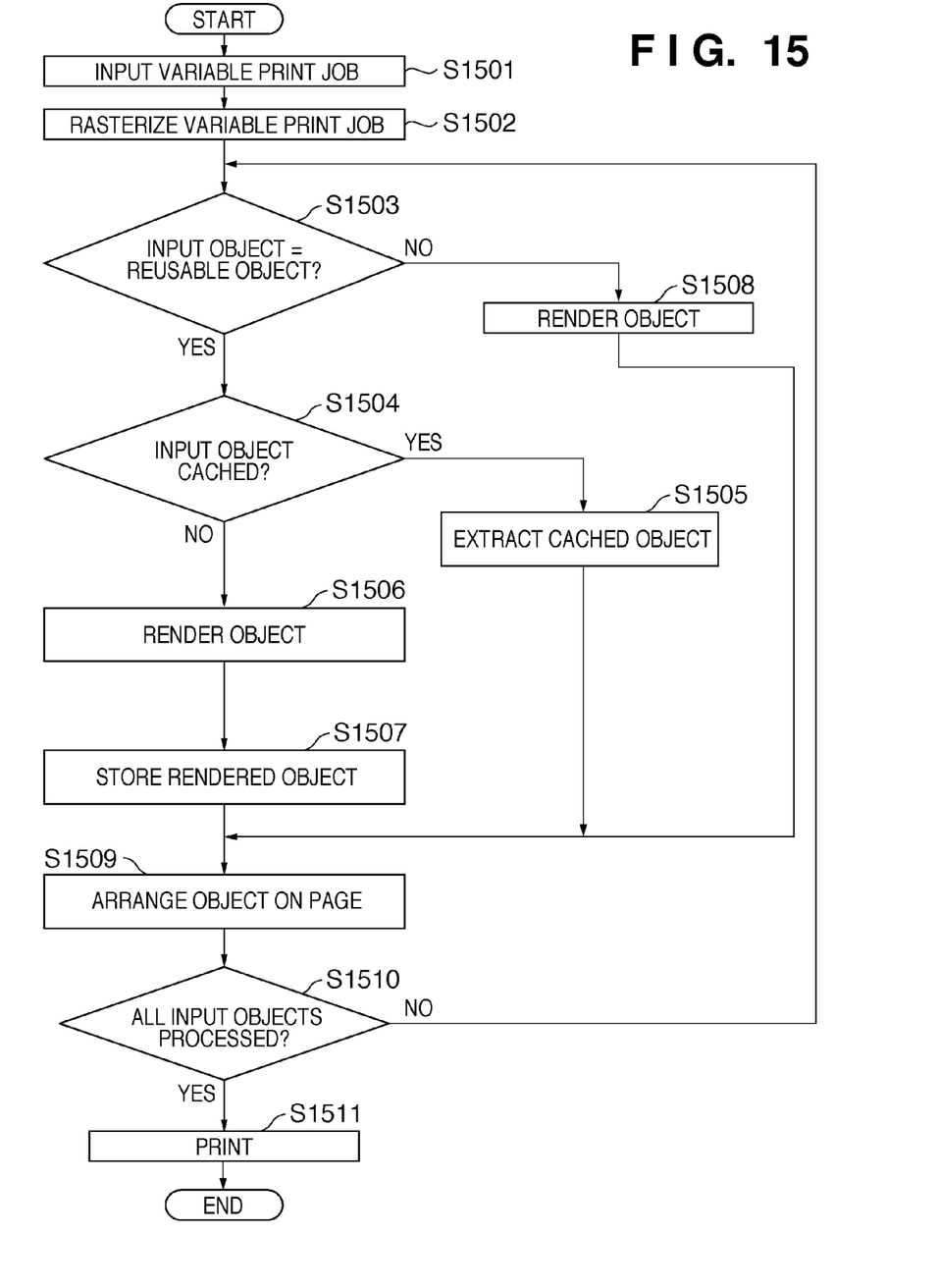
FIG. 15 is a flowchart showing the sequence of variable print processing on the premise of the embodiment.

FIG. 15 is a flowchart showing the sequence of variable print processing on the premise of the embodiment. In step S1501, the network I/F 102 receives a job, the CPU 101 starts executing a program, and the image processing apparatus 100 receives a variable print job via the network I/F 102. In step S1502, the variable print job is rasterized to extract an object for use. In step S1503, it is determined whether the object contained in the rasterized variable print job is a reusable object. If it is determined that the object is a reusable one, it is determined in step S1504 whether data of the input object has already been cached.

If data of the object has already been cached, an object corresponding to the cached data is extracted in step S1505 and arranged on a page in step S1509.

If it is determined in step S1504 that data of the input object has not been cached, the input object is rendered in step S1506. The rendered object is cached in step S1507 and arranged on a page in step S1509. The rendering processing is an example of image forming processing. Other examples of image forming processing are generation of a bitmap and generation of an intermediate code (bitmap object) for forming a bitmap.

If it is determined in step S1503 that the object contained in the rasterized variable print job is not a reusable object, the input object is rendered in step S1508. In step S1509, the object is arranged on a page.

In step S1510, it is determined whether all input objects have undergone the processes in steps S1503 to S1509. If it is determined that all input objects have undergone the processes in steps S1503 to S1509, the process advances to step S1511, and the CPU 101 controls printing to compose a page and perform print processing. Then, the process ends. If it is determined that not all input objects have undergone the processes in steps S1503 to S1509, the process returns to step S1503.

<Sequence of Variable Print Processing According to Invention>

Figure 4:
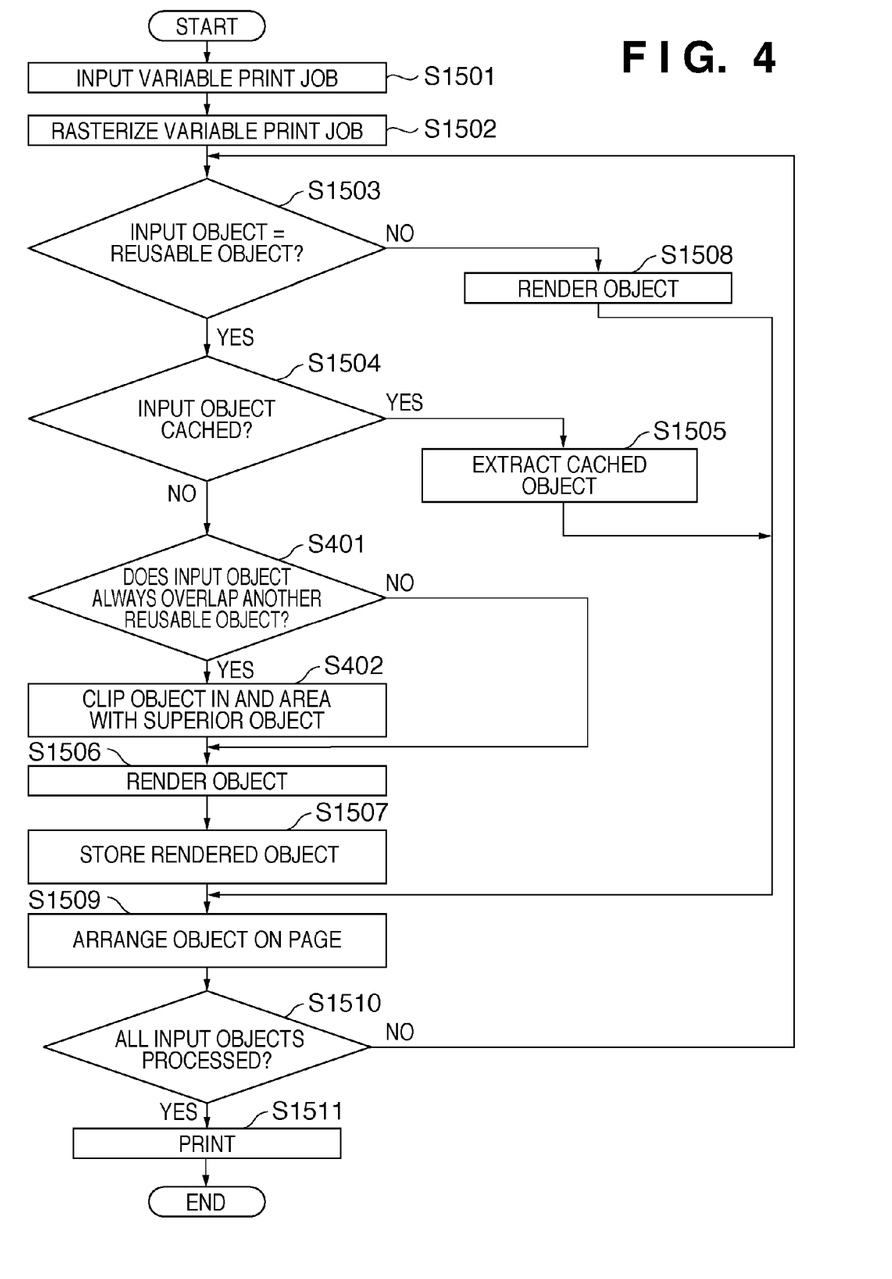
FIG. 4 is a flowchart showing the sequence of variable print processing in the first embodiment.

FIG. 4 is a flowchart showing the sequence of variable print processing in the first embodiment of the present invention.

The processing shown in FIG. 4 is different from that shown in FIG. 15 in steps S401 and S402.

The network I/F 102 receives a job, and the CPU 101 starts executing a program. Steps S1501 to S1504 are the same as those in the sequence of variable print processing shown in FIG. 15.

If it is determined in step S1504 that an input object has not been cached, it is determined in step S401 (example of the second determination processing) whether another reusable object always overlaps the input object. This is equivalent to determining the rectangular region 1401 shown in FIG. 14.

If it is determined that another reusable object always overlaps the input object, the input object is clipped in the AND region of the object overlapping the input object, cutting off the rectangular region 1401 (to be referred to as knockout processing) in step S402. That is, when it is determined in S401 that another reusable object always overlaps the input object, image forming processing is executed based on at least either a fixed object or another fixed object at the overlapping portion. Clipping means performing image processing in only a predetermined region.

In step S1506, the knocked-out object is rendered. The rendered object is cached in step S1507 and arranged on a page in step S1509.

Figure 5:
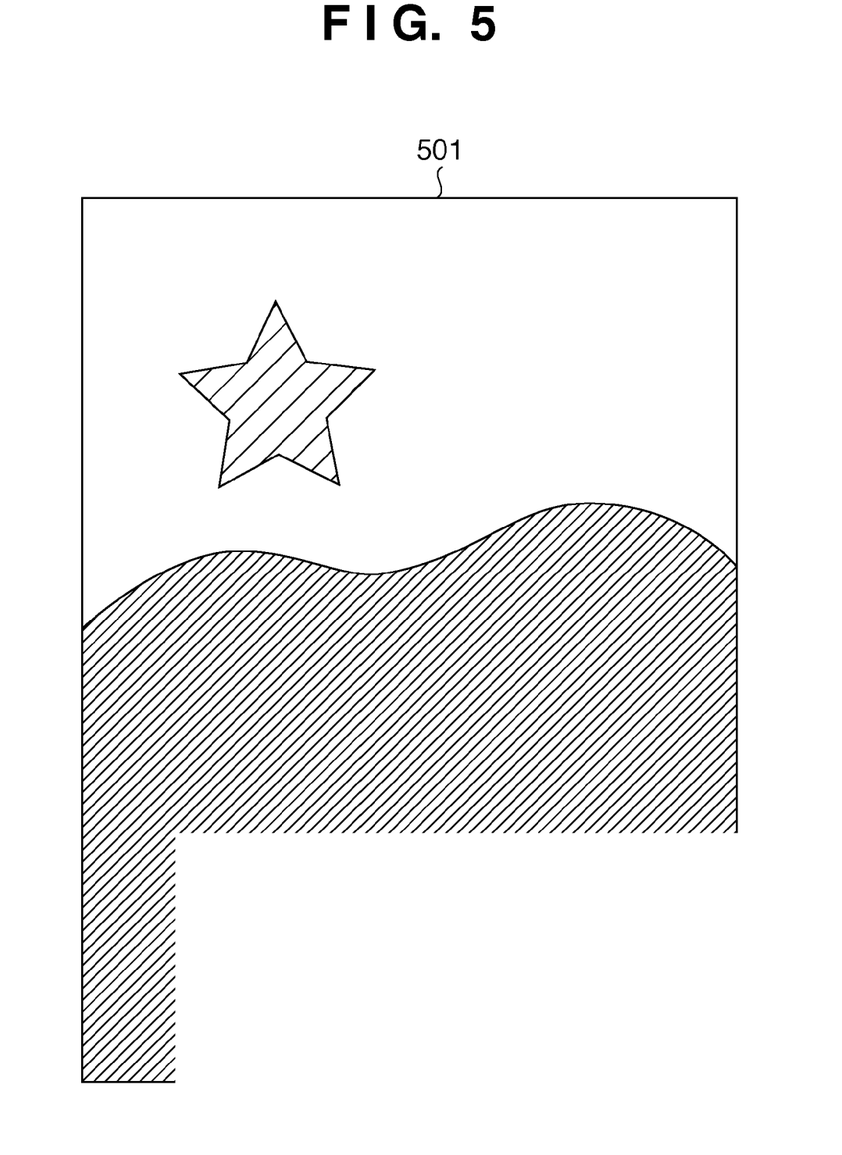
FIG. 5 is a view exemplifying a reusable object in the first embodiment.

FIG. 5 is a view showing a reusable object in variable printing in the first embodiment. A comparison between the reusable object 1201 shown in FIG. 14 and a reusable object 501 shown in FIG. 5 reveals that an unnecessary region is knocked out. Especially upon compression, the reusable object 501 can be cached with a data amount smaller than that of the reusable object 1201.

Also in rasterizing a rendered object on a page in step S1509, the reusable object 501 can be arranged within a shorter processing time than that of the reusable object 1201.

According to the first embodiment, the image processing apparatus can shorten the processing time in high-volume variable printing.

Second Embodiment

The first embodiment reduces the data amount and increases the processing speed by knocking out a region where one reusable object always overlaps another one.

The second embodiment can increase the processing speed even when the HDD 104 for caching has a satisfactory storage capacity.

Figure 6:
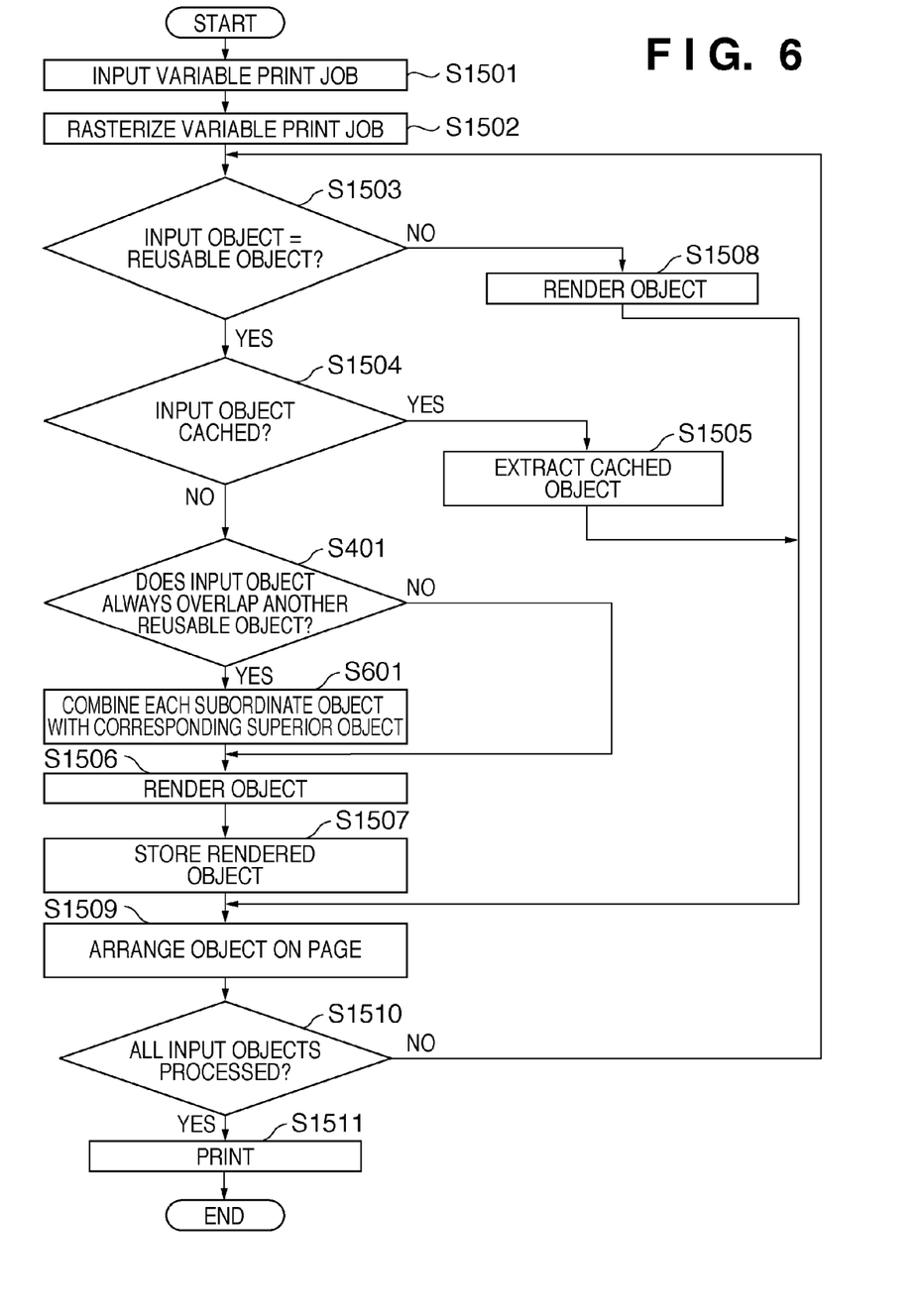
FIG. 6 is a flowchart showing the sequence of variable print processing in the second embodiment.

FIG. 6 is a flowchart showing the sequence of variable print processing in the second embodiment. The processing shown in FIG. 6 is different from that shown in FIG. 4 in step S601. A network I/F 102 receives a job, and a CPU 101 starts executing a program. Steps S1501 to S1504 and S401 are the same as those in the variable print processing shown in FIG. 4.

If it is determined in step S401 that another reusable object always overlaps an input object, each subordinate object is combined with a corresponding superior object in step S601.

Figure 7:
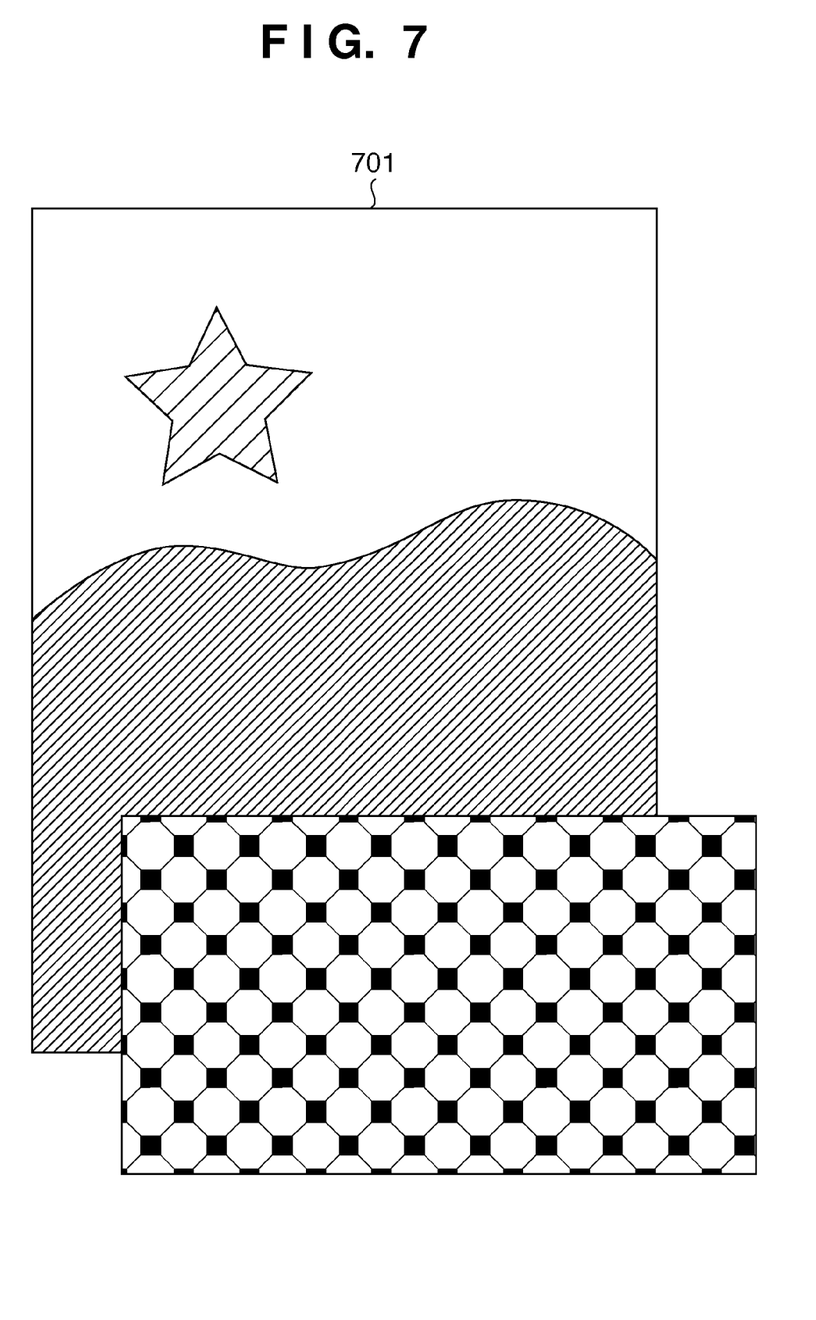
FIG. 7 is a view exemplifying a reusable object in the second embodiment.

FIG. 7 is a view exemplifying a reusable object in the second embodiment. In the second embodiment, for example, a combined object 701 is newly generated by combining a subordinate object (reusable object 1201) and a superior object (other reusable object) in FIG. 12 into one object.

Each combined object is rendered in step S1506 and cached in step S1507.

The combined object 701 in the second embodiment is larger in size than a reusable object 501 shown in FIG. 5. Thus, the storage capacity for caching is larger than that in the first embodiment.

However, compared to the variable printing sequence on the premise of the embodiment, superior and subordinate objects need not be arranged on a page and processed in every printing. The second embodiment can increase the processing speed.

Third Embodiment

The second embodiment achieves efficient caching and high processing speed by combining objects. The third embodiment will be explained.

Figure 8:
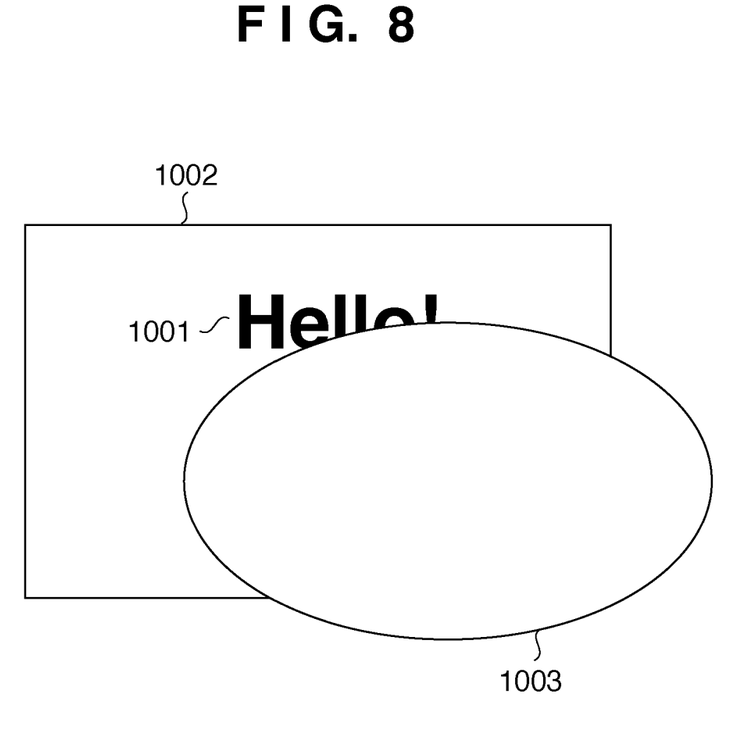
FIG. 8 is a view for explaining an example in which a variable object is arranged between reusable objects in a variable print job.

FIG. 8 is a view for explaining an example in which a variable object is arranged between reusable objects in a variable print job. When a variable object is arranged between reusable objects to overlap them, as shown in FIG. 8, the objects are assumed to be combined as described in the second embodiment.

In this case, a combined object of reusable objects 1002 and 1003 is cached, as described in the second embodiment, so the shape of a variable object 1001 is clipped by the reusable object 1003 and is lost.

The third embodiment is applied to processing of a variable print job in which a variable object is arranged between reusable objects to overlap them, as shown in FIG. 8.

Figure 9:
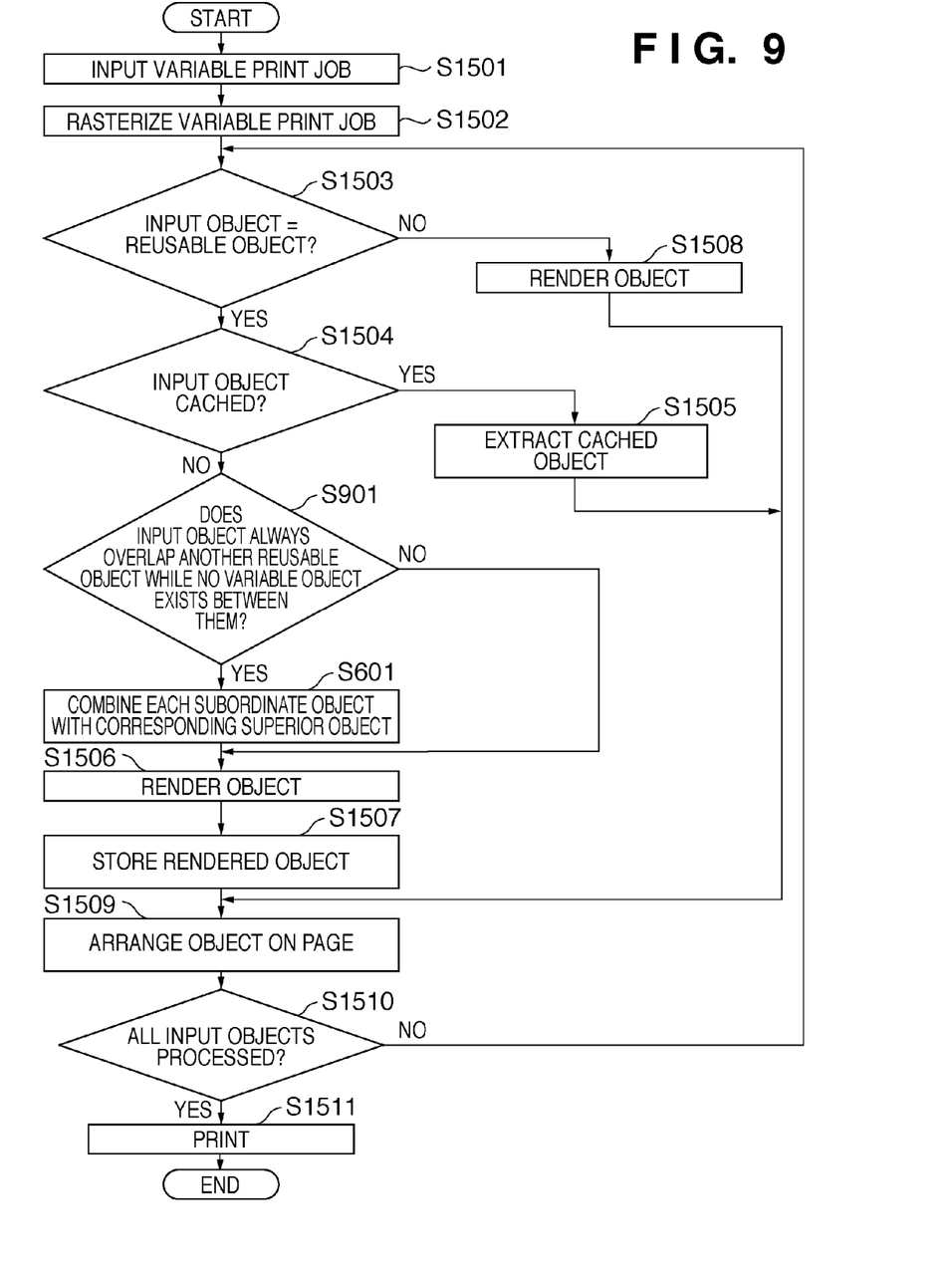
FIG. 9 is a flowchart showing the sequence of variable print processing in the third embodiment.

FIG. 9 is a flowchart showing the sequence of variable print processing in the third embodiment. The processing shown in FIG. 9 is different from that shown in FIG. 6 in step S901.

A network I/F 102 receives a job, and a CPU 101 starts executing a program. Steps S1501 to S1504 are the same as those in the sequence of variable print processing in the foregoing first embodiment.

If it is determined in step S1504 that an input object has not been cached, the process advances to step S901. In step S901, it is determined whether another reusable object always overlaps the input object and a variable object exists between them.

If it is determined that another reusable object always overlaps the input object and a variable object does not exist between them, the process advances to step S601 to combine each superior object with a corresponding subordinate object.

Each combined object is rendered in step S1506 and cached in step S1507.

As described above, in the third embodiment, if a variable object is arranged between reusable objects to overlap them when executing processing as described in the second embodiment, the reusable objects are not combined. The third embodiment can prevent arranging a variable object in an unexpected form in performing the processing described in the second embodiment when the variable object overlaps between reusable objects.

Fourth Embodiment

In the first to third embodiments, a reusable object is used in only a single job and deleted after the end of the job. However, for example, the PPML language sometimes allows adding a service life attribute to a reusable object and defining a reusable object to be shared between jobs (to be referred to as a global reusable object).

The fourth embodiment will explain processing upon receiving a global reusable object.

Figure 10:
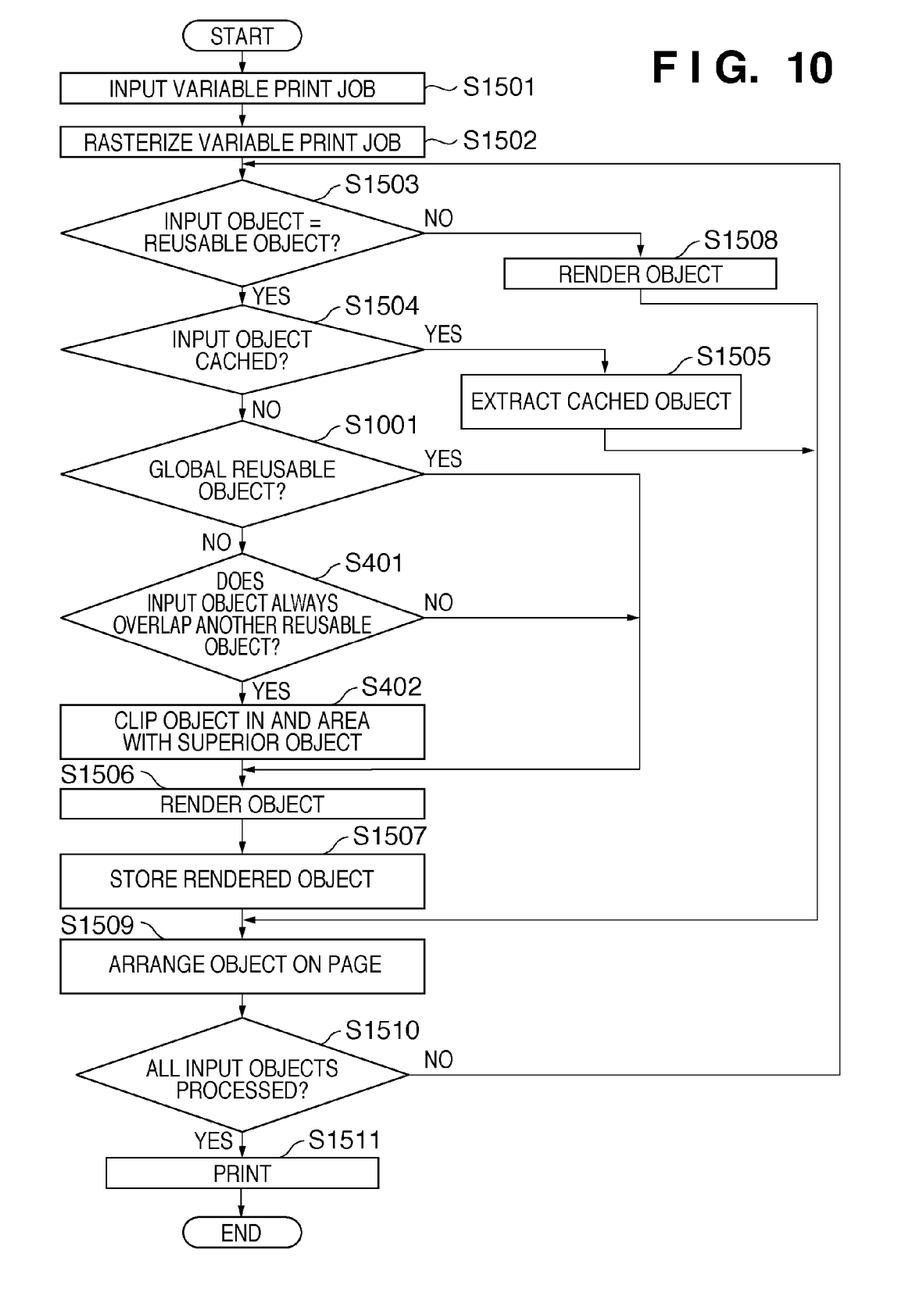
FIG. 10 is a flowchart showing the sequence of variable print processing in the fourth embodiment.

FIG. 10 is a flowchart showing the sequence of variable print processing in the fourth embodiment. The processing shown in FIG. 10 is different from that shown in FIG. 4 in step S1001.

A network I/F 102 receives a job, and a CPU 101 starts executing a program. Steps S1501 to S1504 are the same as those in the sequence of variable print processing shown in FIG. 4.

In step S1001 (example of the third determination processing), the service life attribute of an input reusable object is checked to determine whether the input reusable object is a global reusable object. If it is determined that the input object is a global reusable object, the process advances to step S1506 without clipping reusable objects by themselves as described in the first embodiment. After that, control as described in the first embodiment is performed.

As described above, the fourth embodiment can prevent modifying a global reusable object which may be reused for another job.

Fifth Embodiment

In the fourth embodiment, when an input object is a global reusable object, the global reusable object is cached without modifying it.

In the fifth embodiment, while a global reusable object is cached, a global reusable object modified as described in the first embodiment is also cached.

Figure 11:
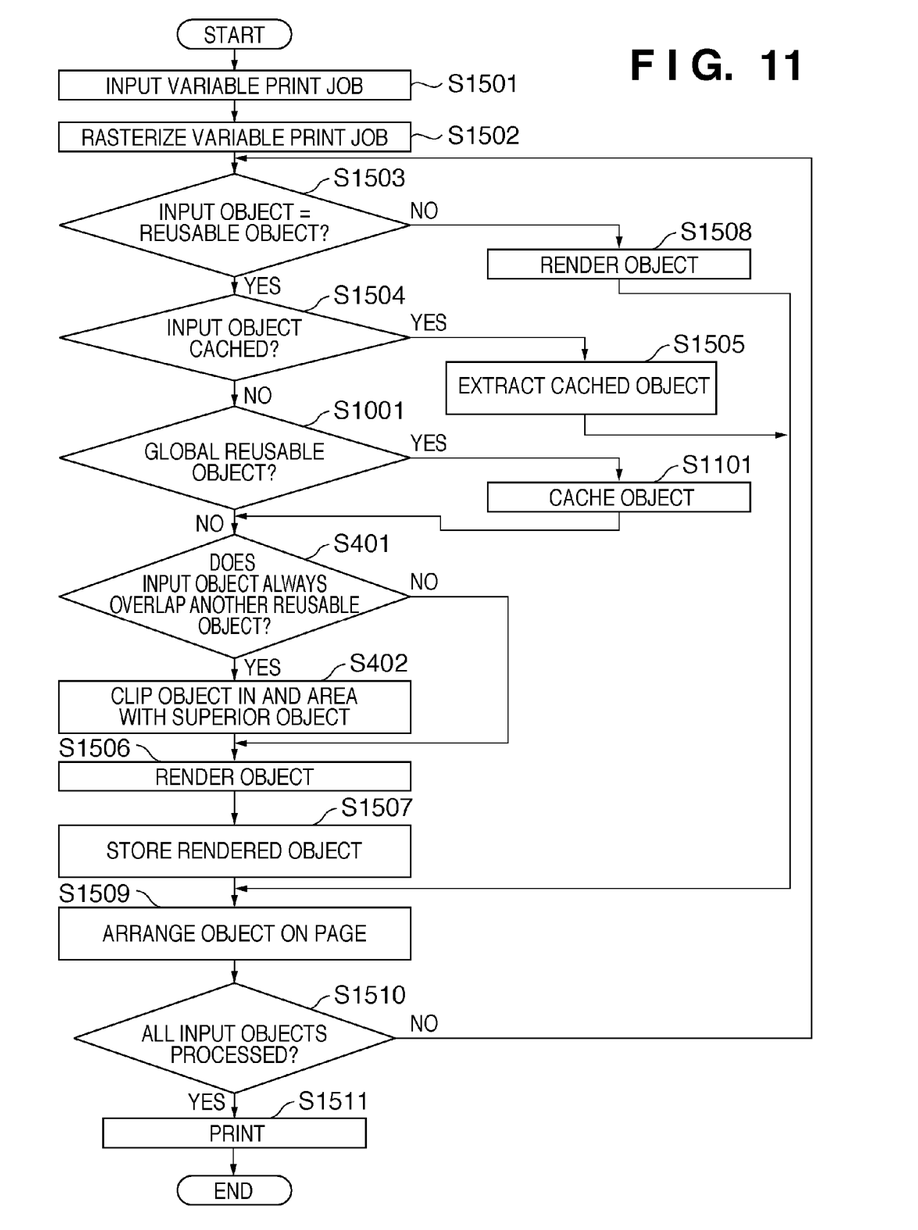
FIG. 11 is a flowchart showing the sequence of variable print processing in the fifth embodiment.

FIG. 11 is a flowchart showing the sequence of variable print processing in the fifth embodiment. The processing shown in FIG. 11 is different from that shown in FIG. 10 in step S1101. A network I/F 102 receives a job, and a CPU 101 starts executing a program. Steps S1501 to S1504 and S1001 are the same as those in the sequence of variable print processing shown in FIG. 10.

In step S1001, the service life attribute of an input reusable object is checked to determine whether the input reusable object is a global reusable object. If the input object is a global reusable object, the global reusable object is cached in step S1101 without modifying it. The unmodified global reusable object is reusable for another job. The subsequent processing is the same as that shown in FIG. 10.

As described above, the fifth embodiment modifies a global reusable object which may be reused for another job. Even when a reusable object in a job is a global reusable object, the fifth embodiment can increase the processing speed, similar to the first embodiment.

In addition, an input global reusable object is directly cached in step S1101. The fifth embodiment can prevent modifying a global reusable object which may be reused for another job.

As described above, the fourth and fifth embodiments are directed to processing when a reusable object is a global reusable object in the first embodiment.

In some cases, a superior reusable object is larger in figure size than a subordinate one and completely covers it. In this case, it is possible to overwrite the subordinate object by the superior object to combine the reusable objects. Instead, the reusable objects may be processed as follows. More specifically, only a superior object having no setting of transparent processing undergoes image forming processing by RIP (Raster Image Processing), and a subordinate object is discarded without processing. As a result, only the superior object can be cached as a reusable object. When a superior object has a transparent attribute, it is possible to simply overwrite it by a subordinate object. This processing is applicable to each embodiment described above.

The technical principle of each embodiment is as follows. Each embodiment discloses the image processing apparatus 100 which performs variable printing in accordance with print data containing a fixed object reused in image formation, that is, RIP and a variable object.

The CPU of the apparatus determines whether the fixed object contained in the print data overlaps another fixed object different from the fixed object. If the CPU determines that the fixed object overlaps the other one, the CPU combines them and executes RIP for the combined object, or performs RIP for either the fixed object or the other one. The CPU is an example of the processing unit, and the processing unit may be implemented by software. Data having undergone RIP by the CPU is stored in the HDD or RAM serving as an example of the storage unit. Data stored in the HDD or RAM is repetitively extracted, and the CPU merges the extracted data with a variable object itself or a variable object having undergone RIP. The CPU can therefore output print data. In the embodiments, a reusable object may be cached as bitmap data or JPEG data, but may also be cached as a rendering command (so-called intermediate bitmap representation).

The fourth and fifth embodiments can be combined with the second and third embodiments. In this case, if it is determined in the second or third embodiment that a reusable object is not a global one, combination processing as described in step S601 of FIGS. 6 and 9 is executed. Alternatively, if it is determined that a reusable object is a global one, the reusable object is temporarily cached for use in another job, and then undergoes combination processing.

As described above, in the first, fourth, and fifth embodiments, a portion of a reusable object that overlaps a superior object is knocked out in a variable print job received in the image processing apparatus. This method is applicable to an image processing apparatus which receives a variable print job and also to an application which generates a variable print job.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-256644, filed Oct. 1, 2008 and Japanese Patent Application No. 2009-206459, filed Sep. 7, 2009, which are hereby incorporated by reference herein in their entirety.

What is claimed is:

1. An image processing apparatus which performs variable printing in accordance with a print job, the apparatus comprising:

a first determination unit configured to determine whether or not a target object is a reusable object that is used in a plurality of pages;

a cache determination unit configured to determine, in a case where the first determination unit determines that the target object is the reusable object, whether or not the target object has been cached;

a second determination unit configured to determine, in a case where the cache determination unit determines that the target object has not been cached, whether or not the target object is a global reusable object which is able to be used in both the print job and another print job;

a storing unit configured to store, in a case where the second determination unit determines that the target object is the global reusable object, the target object on which clipping process is not performed; and a generating unit configured to generate data, in a case where the second determination unit determines that the target object is the global reusable object and in a case where the target object and another object are overlapped each other, by performing the clipping process on the target object by the other object after the storing unit stores the target object on which the clipping process is not performed, wherein the storing unit further stores the data generated by the generating unit.

2. The apparatus according to claim 1, further comprising a second generating unit configured to generate, in a case where the target object completely covers the other object and the target object does not have a transparent processing setting, data based on the target object without the other object.

3. An image processing method which performs variable printing in accordance with a print job, the method comprising:

a first determination step of determining whether or not a target object is a reusable object that is used in a plurality of pages;

a cache determination step configured to determine, in a case where the first determination step determines that the target object is the reusable object, whether or not the target object has been cached;

a second determination step of determining, in a case where the cache determination step determines that the target object has not been cached, whether or not the target object is a global reusable object which is able to be used in both the print job and another print job;

a storage step of storing, in a case where the second determination step determines that the target object is the global reusable object, the target object on which clipping process is not performed; and a generating step of generating data, by performing the clipping process on the target object by another object after the storing step stores the target object on which the clipping process is not performed, wherein the storing unit further stores the data generated by the generating step.

4. The method according to claim 3, further comprising a second generating step of generating, in case where the target object completely covers the other object and the target object does not have a transparent processing setting, data based on the target object without the other object.

5. A non-transitory computer-readable storage medium that stores a computer program for executing a method which performs variable printing in accordance with a print job, the method comprising:

a first determination step of determining whether or not a target object is a reusable object that is used in a plurality of pages;

a cache determination step configured to determine, in a case where the first determination step determines that the target object is the reusable object, whether or not the target object has been cached;

a second determination step of determining, in a case where the cache determination step determines that the target object has not been cached, whether or not the target object is a global reusable object that is able to be used in both the print job and another print job;

a storage step of storing, in a case where the second determination step determines that the target object is the global reusable object, the target object on which clipping process is not performed; and a generating step of generating data, in a case where the second determination step determines that the target object is the global reusable object and in a case where the target object and another object are overlapped each other, by performing the clipping process on the target object by another object after the storing step stores the target object on which the clipping process is not performed, wherein the storing step further stores the data generated by the generating step.

6. The storage medium according to claim 5, further comprising a second generating step of generating, in a case where the target object completely covers the other object and the target object does not have a transparent processing setting, data based on the target object without the other object.

* * * * *